(12) United States Patent
Dorai et al.

(10) Patent No.: US 7,899,210 B2
(45) Date of Patent: *Mar. 1, 2011

(54) SYSTEM AND METHOD FOR ENHANCING SECURITY APPLICATIONS

(75) Inventors: Chitra Dorai, Chappaqua, NY (US); Edith H. Stern, Yorktown Heights, NY (US); Barry E. Willner, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 858 days.

This patent is subject to a terminal disclaimer.

(21) Appl. No.: 11/842,215

(22) Filed: Aug. 21, 2007

(65) Prior Publication Data
US 2007/0279527 A1 Dec. 6, 2007

Related U.S. Application Data

(63) Continuation of application No. 10/607,659, filed on Jun. 27, 2003, now Pat. No. 7,283,644.

(51) Int. Cl.
*G06K 9/00* (2006.01)

(52) U.S. Cl. ............... 382/103; 382/100; 381/115; 455/556.1; 379/45; 340/506

(58) Field of Classification Search ............... 382/100, 382/103; 381/115; 455/556.1; 379/45
See application file for complete search history.

(56) References Cited

U.S. PATENT DOCUMENTS

| 6,182,218 | B1 | 1/2001 | Saito |
| 6,292,542 | B1 | 9/2001 | Bilder |
| 6,477,362 | B1 | 11/2002 | Raith et al. |
| 6,542,075 | B2 * | 4/2003 | Barker et al. ............... 340/506 |

* cited by examiner

*Primary Examiner*—Tom Y Lu
(74) *Attorney, Agent, or Firm*—Jon A. Gibbons; Fleit Gibbons Gutman Bongini & Bianco PL

(57) ABSTRACT

A security system and methodology are provided employing a process that determines whether to use an image and/or other inputs received from at least one remote input node. In one illustrative embodiment, the invention comprises a system and method for using image input in conjunction with wireless transmission to increase personal safety.

11 Claims, 7 Drawing Sheets

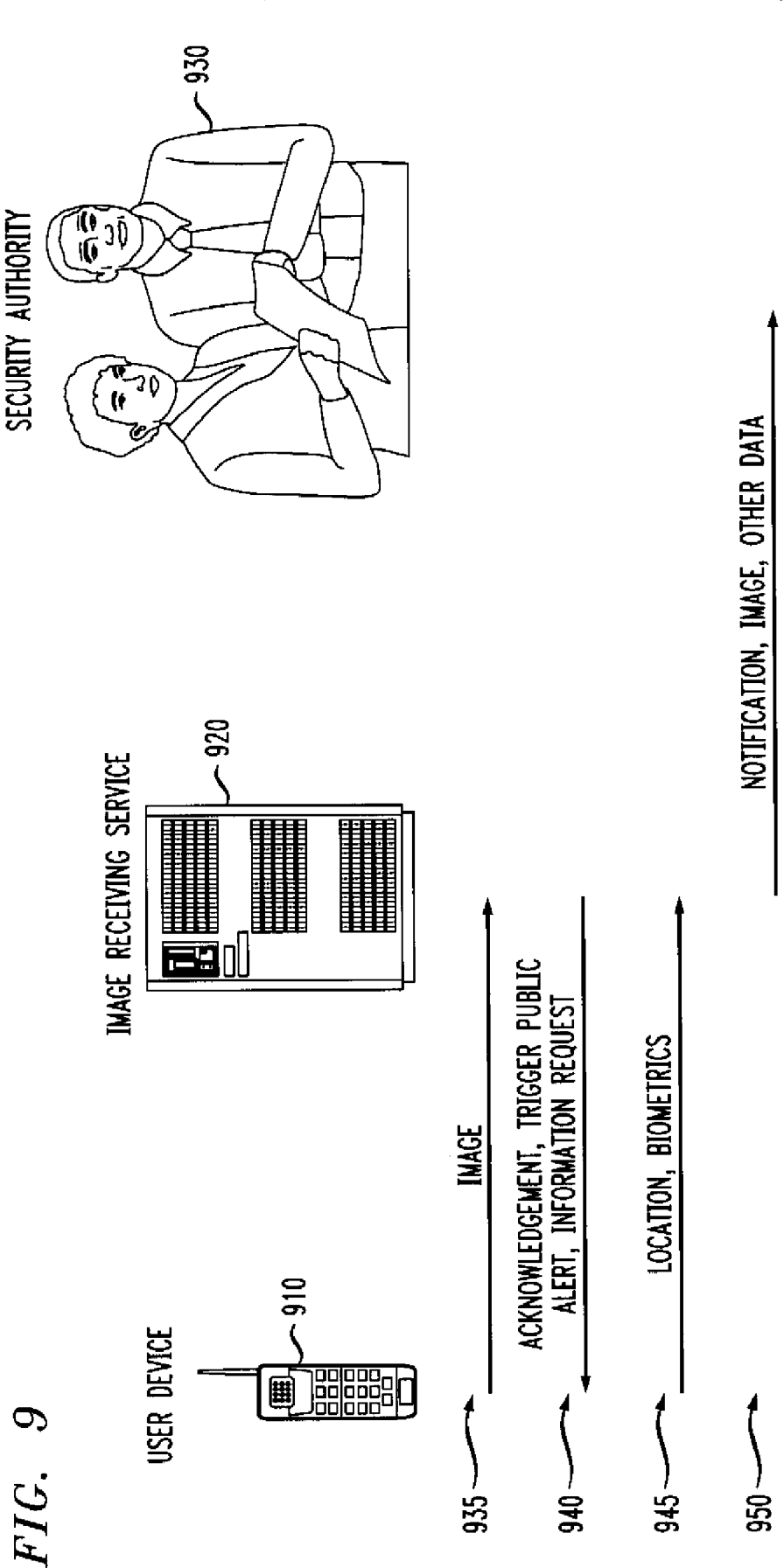

US 7,899,210 B2

SYSTEM AND METHOD FOR ENHANCING SECURITY APPLICATIONS

CROSS-REFERENCE TO RELATED APPLICATION(S)

This application is a continuation of pending U.S. application Ser. No. 10/607,659, filed on Jun. 27, 2003, the disclosure of which is incorporated by reference herein.

FIELD OF THE INVENTION

The present invention relates to a security system and, more particularly, to a security system employing a process that determines whether to use an image and/or other inputs received from at least one remote input node.

BACKGROUND OF THE INVENTION

This invention is in the field of security systems, digital media systems, and wireless systems enabling multimedia. We discuss background for each of these areas.

Devices and services for multimedia messaging. Digital cameras, cameras integrated with cell phones and other media capture devices are increasing in number and usage. Such devices are commonly offered for sale, and services referred to as "multimedia messaging" offered by providers, such as Sprint and T-Mobile, allow wireless transmission of digital images as part of a multimedia e-mail. These services require moderate bandwidth and are offered today in the United States, Europe and in parts of Asia.

Devices available for such digital media-oriented services include non-integrated offerings, such as cell phones which attach via cable or wireless communication to cameras. One example offered by Nokia is the Nokia camera headset, which attaches to compatible Nokia mobile phones for image viewing and wireless transmission of images.

Integrated devices are also available for digital media-oriented services. An example offered by Nokia is the Nokia 3650, with an integrated digital VGA (video graphics adaptor) camera. Sanyo and others offer integrated devices, e.g., the Sanyo 5300 has a built-in VGA camera and external color display.

Multimedia messaging services, such as PCS (personal communications system) vision service from Sprint, allow users to capture, transmit and receive digital images. In accordance with such a service, a user snaps pictures with a PCS vision camera. The pictures may then be uploaded so as to be shared with others. Vision-enabled PCS phones with picture capability can view, access, and share pictures, right on the display screen of the phone. These services add images to existing voice and text messaging, thus providing a multimedia messaging service.

Digital media and content management. Digital media is created not only through capture of an image or video using a digital device, but also through digitizing existing analog media. Manipulation of such data has been pioneered by the entertainment industry, with applications such as reissuance of old films to be sold in the new DVD (digital video or versatile disk) format providing business incentive. Management of such digital assets is an important element of such reuse and repurposing.

Media management systems in general refer to systems that capture, digitize and allow management of media assets. Media management systems are widely used in the entertainment industry and advertising, where content grows rapidly and where efficient access to stored items can provide business advantage. IBM Content Manager is an example of such a system and provides workload processing involved in the media value chain of ingest, annotation, cataloguing, archiving, search and retrieval, and optionally digital media streaming.

There are a number of techniques for managing and protecting digital content. By way of example, U.S. Pat. No. 6,182,218 discloses a system for managing digital content, particularly a digital content to which a copyright is claimed, and a system for supplying a public-key used in the management of the content. This reference also discloses how to alleviate unauthorized use of the content.

Emergency and security devices and services. In 1957, the National Association of Fire Chiefs recommended use of a single number for reporting fires, and in 1968, AT&T announced 911 as the nationwide emergency number. Since that time, 911 has represented the standard for emergency services response.

Enhancements of the original 911 service are disclosed by references such as U.S. Pat. No. 6,292,542, which teaches alternate methods for accessing emergency services by telephone.

U.S. Pat. No. 6,477,362 teaches techniques which pass the mobile unit's phone number along to an appropriate emergency service center in addition to location information. This reference shows how this additional information can be transmitted and revealed in an emergency situation.

Flight data recorders, also known as "black boxes," provide information on airline accidents. It is known that large commercial aircraft and some smaller commercial, corporate, and private aircraft are required by the FAA (Federal Aviation Association) to be equipped with two black boxes that record information about a flight. Both recorders are installed to help reconstruct the events leading to an aircraft accident. One of these, the CVR (cockpit voice recorder), records radio transmissions and sounds in the cockpit, such as the pilot's voices and engine noises. The other, the FDR (flight data recorder), monitors parameters such as altitude, airspeed and heading. While this information does not prevent accidents, it can be used to help determine the cause of an accident after it has happened.

Another safety concern lies not with airplanes, but with individuals. Personal safety is a fundamental issue, and of increasing priority to people living all over the world. Women in particular, have long taken extra precautions when traveling alone or in areas deemed to be of higher risk, such as city streets late at night. Children of any age are deemed to be more at risk from violence, whether it be in the playground, at school, or elsewhere.

Technology has been applied to make this problem more tractable. Cellular phones are often given to individuals as a measure of increasing safety. Individuals with physical disabilities may use cell phones to call for assistance when needed; children are given cell phones by worried parents so that the parents can have the comfort of near-instant contact when desired.

Surveillance systems. Current digital video surveillance systems (e.g., Lenel, Inc.) primarily exploit digital infrastructure to store and distribute surveillance footage digitally. In surveillance systems, cameras that monitor people, things, and/or places often feed still images or low frame rate analog video into video recorders for recording and storage with possible use as evidence in the event of litigation. Sometimes digital cameras are employed as surveillance and security monitoring devices and they result in digital media which is stored for later use. The digital form allows for compressed storage and rapid distribution to central servers for further analysis. The current state of the art in surveillance involves human monitoring of the video, while it is being recorded or after it has been recorded, to generate real-time alerts of incidents, to track and mark anomalous events for interdiction, or later search and retrieval to prescribe preventative safety measures in public places, etc.

Problems with the Above-described Systems. Emergency services as described above do not provide maximum information related to the emergency. 911 services are voice-oriented, and provide little deterrent to crime and emergencies of a security nature. Many news magazine stories are based around chilling 911 tapes that while heartrending cannot be used to identify perpetrators of crime. Accordingly, there is a need for techniques that provide more information, such as image data available from integrated devices, and that provide it under conditions which may precede an emergency.

Emergency monitors, such as surveillance cameras, are not ubiquitous. While a camera may observe the area in front of an ATM (automated teller machine), there are many locations not surveyed by such instrumentality. Police officers on the streets patrol physically in order to prevent crime, and while video in police cars captures some interactions between police and others, there are many locations at any given time where police are not present and where problems occur. Accordingly, there is a need for techniques that provide video and image surveillance at the point of need.

Manual emergency procedures, such as dispatch of police units, often rely on subjective measures and memories for follow-up action. Accordingly, there is a need for techniques that capture, at the point of need and potentially prior to an emergency, data that can assist in follow up actions. Further, there is a need for techniques that minimize latency in triggering such capture. An additional need is to collect such data in a manner that its existence is known and may act as a deterrent to crime.

Recently more attention is being paid to harnessing the true advantage of digital video, namely, the capability to automatically analyze and index the video in real time. Such systems can be utilized in airports, high security facilities such as nuclear power plants, or even post offices. These systems serve fixed areas, generally by means of fixed cameras. The cameras are either wired, or else communicate through limited range wireless capability. Accordingly, there is a need for techniques that provide digital media benefits at the point of need, for example, in a WAN (wide area network) environment.

Information such as that captured by surveillance gear is today analyzed manually, for the most part, and therefore not scaleable. As more data is captured from integrated devices, the amount of data grows dramatically. When such large amounts are captured through devices, as we have described, there can be difficulties in analyzing it in a timely fashion. Accordingly, there is a need for techniques that automatically analyze such data, for example, to allow scaleability.

SUMMARY OF THE INVENTION

The present invention provides a security system and methodology employing a process that determines whether to use an image and/or other inputs received from at least one remote input node.

In one aspect of the invention, a technique for providing security in accordance with at least one user comprises the following steps/operations. First, at least one image associated with a user device is received. The user device is associated with the at least one user. The at least one image is then associated with user data. A determination is made whether to use the at least one image. Then, the at least one image and at least a portion of the user data is used when indicated to do so in accordance with the determining step/operation.

The inventive technique may further comprise the step/operation of specifying a process for determining whether to use the at least one image. Further, the specifying step/operation may comprise specifying a criterion. Still further, the specifying step/operation may comprise permitting the at least one user to specify the process for determining whether to use the at least one image. Also, the specifying step/operation may comprise recording user data.

The inventive technique may further comprise the step/operation of receiving user device data. The user device data may comprise at least one of location, altitude, biometric information, communications capability, functional capability, current communications speed, display capability, ability for remote management, recorded voice, and recorded locations. Other forms of device data may be received.

The user data may comprise at least one of a calling number, a user name, a communication address associated with receipt of the at least one image, a user identification, a user location, user preference information, previous user behavior, user network access information, legal records pertaining to a user, privacy policies pertaining to a user, and a user service specification. Other forms of user data may be employed.

The determining step/operation of the inventive technique may be responsive to an arrival rate of data from the user device. The determining step/operation may be independent of further communication with one of the at least one user and the user device. The determining step/operation may further comprise at least one of applying one or more rules of a specification of a service offering, applying one or more rules of a previously entered user specification, and applying one or more rules responsive to at least one of a location, a time of day, a consideration of multiple factors. The multiple factors may comprise a time of data transmission combined with a lack of subsequent data transmission. The step/operation of applying one or more rules of a specification may comprise at least one of speaker identification and face identification.

The using step/operation of the inventive technique may further comprise at least one of a transmission to a third party and logging for subsequent use. The third party may comprise at least one of a security service and law enforcement.

The inventive technique may comprise the step/operation of storing the at least one image. The technique may also comprise the step/operation of receiving an indication of emergency from the at least one user.

In another aspect of the invention, the inventive technique may be implemented in accordance with at least one processor and a memory. The at least one processor and the memory may comprise a server.

In yet another aspect of the invention, the inventive technique may be implemented as an article of manufacture for providing security in accordance with at least one user, comprising a machine readable medium containing one or more programs which when executed implement the steps of the inventive technique.

In a further aspect of the invention, a technique for operating a security service comprises the following steps/operations. At least one user is enrolled in the security service. At least one image associated with a user device is received, the user device being associated with the at least one enrolled user. A determination is made whether to use the at least one image. The at least one enrolled user is charged a fee for the security service. Such an arrangement may be made between the at least one user and the security service provider via a service contract or some other form of agreement.

The inventive technique may further comprise the step/operation of providing wireless communication for the user device. The enrolling step/operation may further comprise receiving user data.

In yet another aspect of the invention, a technique for providing security in accordance with at least one user comprises the following steps/operations. One or more images are captured in accordance with a user device, the user device being associated with the at least one user. At least one of the one or more captured images is transmitted from the user device to a security service. The public is alerted, via the user device, in accordance with the capture of the one or more images.

The alerting step/operation may further comprise use of at least one of a visual indicator, an audible indicator, an alarm, and a spoken phrase. The inventive technique may also comprise receiving voice data.

In a further aspect of the invention, apparatus for providing security in accordance with at least one user comprising a device for use by the at least one user operative to: (i) capture one or more images; (ii) transmit at least one of the one or more captured images to a security service; and (iii) alert the public in accordance with the capture of the one or more images. Such devices may be sold as security client devices and the public may be educated (e.g., via advertising) regarding one or more methods of public alert that may be associated with the security client devices.

Accordingly, in one illustrative embodiment, the invention may comprise a system and method for using image input in conjunction with wireless transmission to increase personal safety. Devices are now available with integrated camera and wireless capability. Examples include: iPAQ, Nokia 7650 and Jphone in Japan. Phones and service are available from Sprint and T-Mobile, among other service providers.

More particularly, the invention may comprise a system for managing this data, and its transmission, as well as enabling new applications and services making use of this data. A client resident system may have middleware which caches, manages, and transmits data using hierarchical organization as well as smart policies which take into account factors such as: data priority; bandwidth availability; bandwidth cost; situational context; and/or trigger events. A server system may have processes for receiving at least one image associated with a user device, associating the image with user data, determining whether to use the image and using the image and at least some of the user data. Beyond improved personal safety related services, new services are enabled by the invention including, but not limited to, image-enhanced 911, a personal blackbox, a public alert, etc.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 9 is a diagram illustrating a call flow example with public alert, according to an embodiment of the present invention.

DETAILED DESCRIPTION OF PREFERRED EMBODIMENTS

The following description will illustrate the invention using an exemplary client-server system architecture. It should be understood, however, that the invention is not limited to use with any particular system architecture. The invention is instead more generally applicable to any system architecture in which it is desirable to enhanced security applications. That is, techniques of the present invention may be implemented on a single computer system or on multiple computer systems coupled by a suitable network, examples of which will be described below. Note that, as used in accordance with the invention, use of the word "image" is intended to represent both a single still image and a sequence of images (e.g., video).

Figure 1:
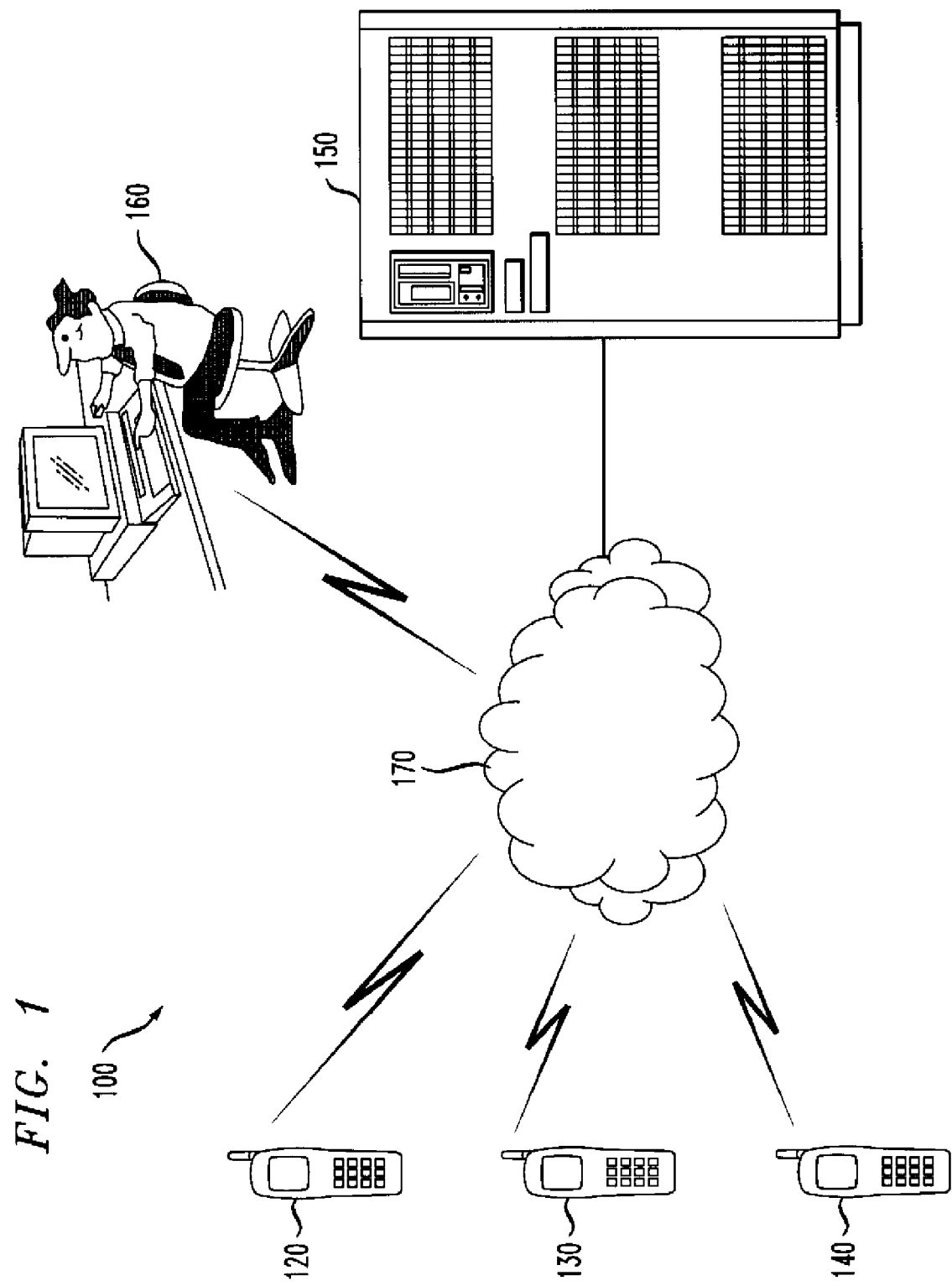
FIG. 1 is a block diagram illustrating a multimedia messaging system with manual analysis.

Referring initially to FIG. 1, a block diagram illustrates a multimedia messaging system (MMS) 100 with manual analysis. Operations of system 100 include image capture, transmission and storage. As illustrated in FIG. 1, devices 120, 130 and 140 are cell phones integrated with digital cameras used for image capture. The cell phones are connected via a network 170. The network 170 may be a GPRS (general packet radio service) network, a 3G (3rd generation) network, or a network permitting access by other wireless means. It is anticipated that multiprotocol devices will soon be available, for example, allowing wireless connectivity through several different protocols, such as 3G and 802.11B. System 100 allows the cell phones to send images to each other. That is, cell phone 120 can capture an image in its vicinity and transmit it for viewing to cell phone 130 and/or cell phone 140. The protocol for this is conventional e-mail, and is well known in the art.

Devices 120, 130 and 140 capture digital images and transmit them via network 170 to an e-mail server 150. This e-mail server accepts the images, and enables storage of the images. The storage may be physically part of the server 150, attached via network, or associated with a distributed computing environment such as a grid. The e-mail containing the images can also be received at a desktop workstation 160, connected to network 170. Using conventional e-mail software, the user of the workstation can check his mailbox, determine that the e-mail has arrived, and direct the workstation to display it. Any captured images may be manually analyzed or reviewed for security or other concerns by the recipient.

Figure 2:
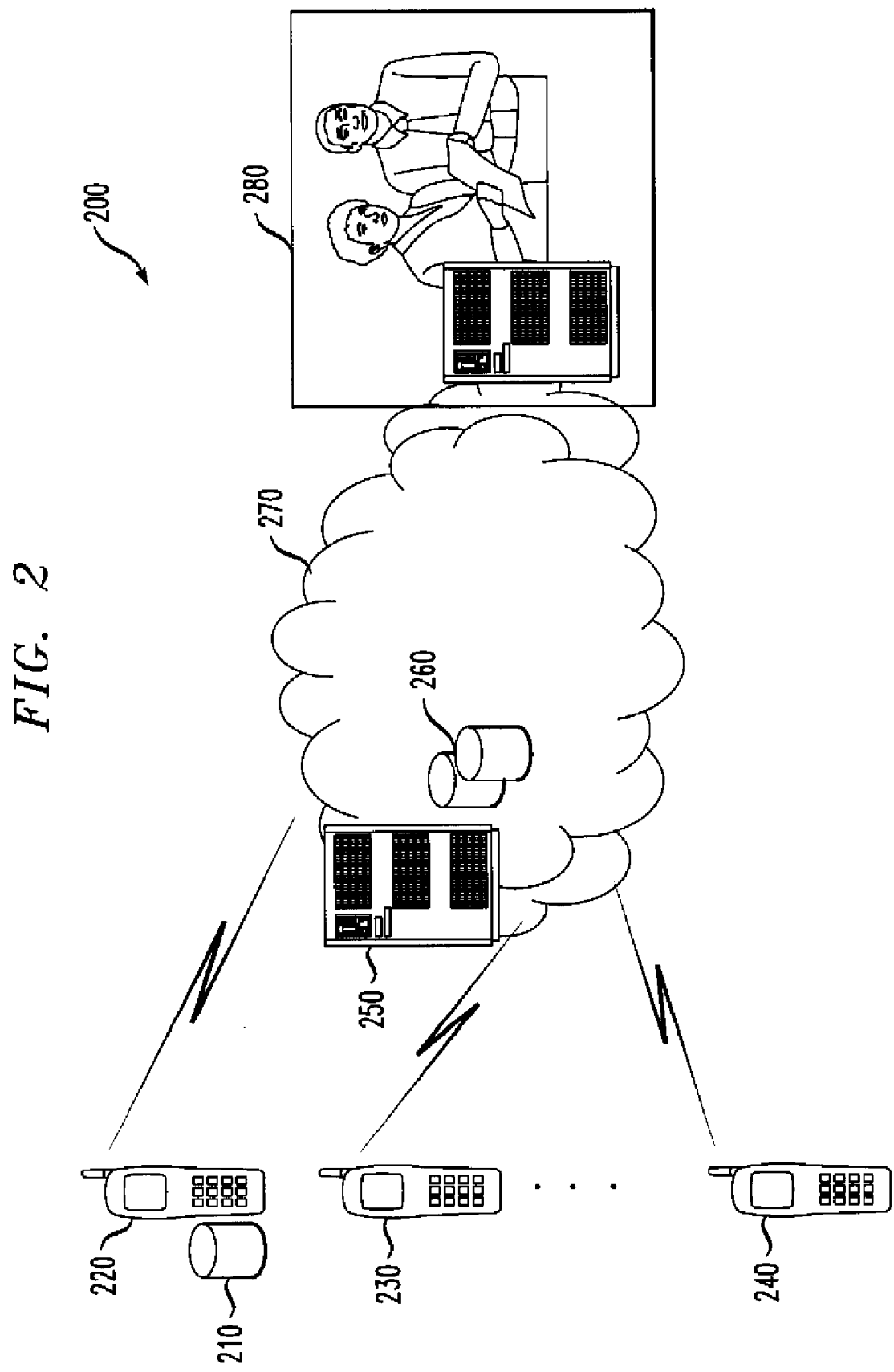
FIG. 2 is a block diagram illustrating a security system, according to an embodiment of the present invention.

Referring now to FIG. 2, a block diagram illustrates a security system 200, according to an embodiment of the present invention.

As illustrated in FIG. 2, devices 220, 230 and 240 represent devices (input nodes) each associated with an individual user. It is to be understood that while only three input nodes are illustrated in FIG. 2 for the sake of clarity, security system 200 may include more or less input nodes. These devices have the ability to acquire an image and transmit it wirelessly to a distant location upon acquisition. The image acquisition may be triggered by a user action (alerting trigger), or may be continuous, with analysis providing the alerting trigger. A single user action (e.g., press of a button) may cause capture and transmission of the image. Device 220 has storage 210 allowing for buffering and storage at the input node. While not intended to be limited thereto, devices 220, 230 and 240 may further have one or more of input analysis capability, rules or algorithms for analyzing input to decide what to store and what to delete, rules and algorithms for analyzing current communications capability and deciding what to communicate to central storage and what to retain, connection to a communications capability to an alert system, rules and or algorithms for analyzing input and characteristics of communications capability and deciding what to send to the alert system, rules and or algorithms for analyzing communications capability and deciding what bandwidth to request of such communications capability, ability to receive end user input, and ability to adjust rules and algorithms based on user input.

Server 250 with storage capability 260 represents the receiving server. Note that storage 260 may be physically associated with server 250 or may be accessible via a network in a configuration such as a SAN (storage area network) or NAS (network attached storage). Storage 260 may be attached to a server in communication with server 250. Server 250 receives the image data from devices 220, 230 and 240 via network 270 or via a wireless access network connected to network 270. Wireless access networks may include those supporting 2.5G, 3G, 802.11, or Bluetooth, although the invention is not limited thereto.

Server 250 provides security processing which includes receiving images from user devices, associating these images with user data, determining whether to use these images, and using one or more images with at least some of the user data. Further, the processing may include, but not limited thereto, one or more of: receiving additional context data (e.g., location, time), acquiring additional context (e.g., calendar information may be acquired from this or another information technology system), logging, storing for extended use, waiting for further signals from the user, evaluating image for risk, evaluating further signals for risk (e.g., audio), face identification, evaluating face identification for risk (e.g., "wanted"), and submitting the information which may include the original image to law enforcement authorities. This information may or may not be of use in court proceedings. It may be of use for law enforcement officials in apprehending miscreants. Server 250 may include access to user data independent of image capture, such as, by way of example only, user profiles, user service specifications, home address, calendar information, preferred routes, restraining orders, and so on. Alternatively, storage 260 may include such user data. Using the data, the server may transmit an alert to security authority 280. Such security authorities may include, by way of example only, public police, campus security, corporate security, etc.

Security authority 280 should have capability to remedy the cause of the alert. Such remedy may be dispatching police, informing additional security authorities, such as fire department, or homeland security. Further, server 250 may provide additional alerts to other concerned parties, such as employer or family, and may select images for transmission.

An exemplary end user scenario which this system supports is as follows: an individual carrying an integrated device 210 believes that she is in a dangerous situation. She may feel threatened by a second person following closely. The individual pulls out device 210, presses a button, the image is taken and immediately transmitted to the receiving server 250. The receiving server receives the image, associates the image with user data (e.g., the user's identification or ID). The user data specifies that upon receipt of the image, the police are to be dispatched. The receiving server has determined that the image and phone number are to be sent to the police, along with available location data. This data is transmitted to the police 280. The police are dispatched to the scene. On the way to the scene, the police encounter an individual whose face matches the transmitted image, running away from the identified location. The police stop the man for questioning.

Alternately, the "threatening" individual has been made aware that his image has been transmitted to the receiving server. This is done by a sequence of flashing lights on the user device, He now knows that he will be identified should any trouble arise. The man leaves the scene with no further activity.

Figure 3:
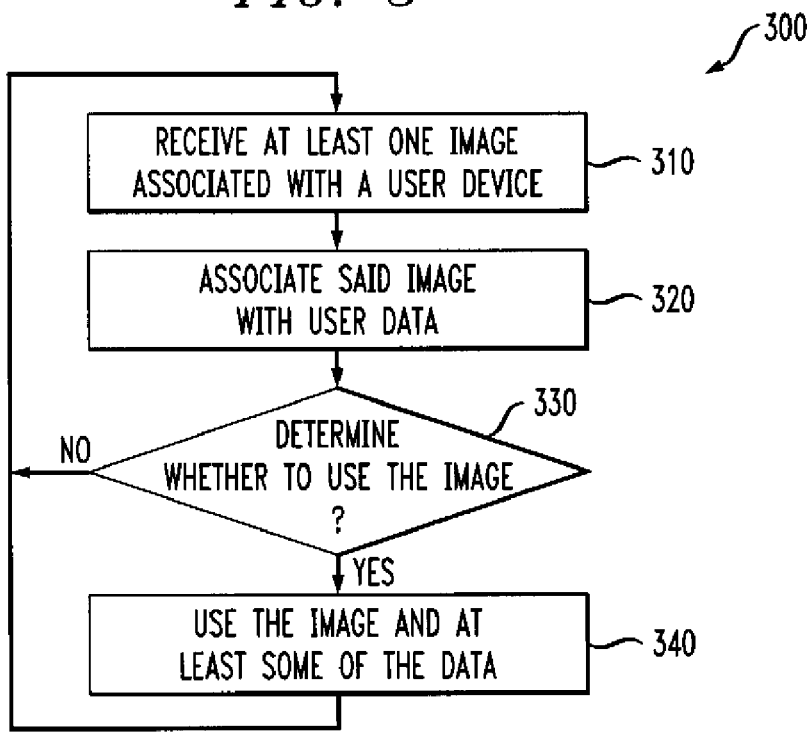
FIG. 3 is a flow diagram illustrating a security methodology, according to an embodiment of the present invention.

Referring now to FIG. 3, a flow diagram illustrates a security methodology 300, according to an embodiment of the present invention. It is to be understood that FIG. 3 illustrates the inventive methodology from the perspective of the server (e.g., server 250) which receives the images.

In step 310, at least one image associated with a user device is received. The image may be received over a cellular or WAN wireless connection, a wireless LAN (local area network) connection, an ultrawideband connection or other wireless; it may be received over the Internet, or any other suitable network. Optionally, an acknowledgment may be sent to the user device that the image has been received.

In step 320, the image is associated with user data. User information may be obtained from the user device, or from data located elsewhere. Data obtained from the user device may include, but is not limited to, biometrics information, location information, or voice. Data may include, but is not limited to, user ID, user name, user location, user preference information, previous user behavior, user network access information, legal records pertaining to user, privacy policies pertaining to user. Details of step 320 are described in more detail below in the context of FIG. 4.

In step 330, methodology 300 determines whether or not to use the image. Details of step 330 are described in more detail below in the context of FIG. 5. This determination may be based on, but not limited to, a specification of the service offering, on a previously entered user specification, on a location, on a time of day, on a consideration of multiple factors such as time of transmission combined with lack of subsequent transmission. For example, a user may have the following service: when an image is transmitted, it is retained for five minutes. If no subsequent notification is received from the user, then the user is considered under threat and the image is "used," that is, the image is transmitted to a security authority such as the police.

If the decision in step 330 is that the images are not to be used, methodology 300 returns to step 310. If the images are to be used, methodology 300 continues to step 340. In step 340 the images are used. Using may include, but is not limited to: transmission to a third party, such as a security service or the police, and logging for later examination. Methodology 300 then returns to step 310, and the process may be repeated. Note that this process may be performed on behalf of multiple users, and multiple images. It may be offered in conjunction with a communications service, by a provider such as a cellular carrier; it may be offered by a security service and include communications; it may be offered by a security service, with communications supplied by a third party. Other possible providers include a municipality, school or other organization or an enterprise for its employees.

A secondary scenario which this system supports: an individual carrying an integrated device is threatened by a second person. The individual pulls out the device, presses a button, the image is taken and immediately transmitted to the central store. The attacker may destroy the device, but the rapid transmission of the image means that despite such attempts, the information has been secured in a distant location. The image results in an emergency alert being transmitted to the nearest police officer, optionally with a location coordinate, who arrives at the scene in a timely fashion.

Figure 4:
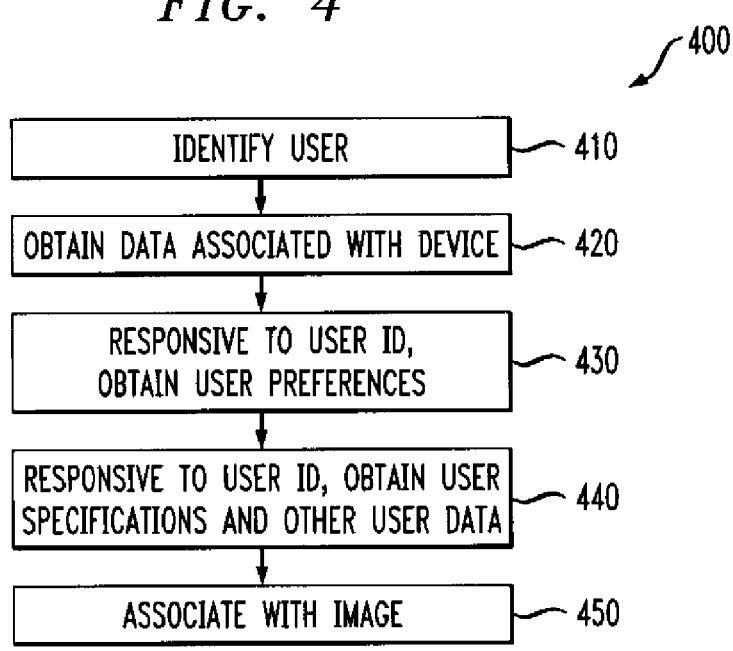
FIG. 4 is a flow diagram illustrating a process of associating an image with user data, according to an embodiment of the present invention.

Referring now to FIG. 4, a flow diagram illustrates a process 400 of associating an image with user data, according to an embodiment of the present invention. As mentioned above, FIG. 4 relates to details of step 320 of FIG. 3.

In step 410, process 400 identifies the end user. The end user is generally associated with the device from which the image was received. This may be accomplished, for example, by examination of the calling number, originating IP (Internet Protocol) address or another communication address associated with the receiving of the image.

In step 420, process 400 obtains information associated with the device. This information may have been received in conjunction with the image received, it may be obtained from a service location, e.g., a central store, or it may be obtained by request from the device. Information associated with the device may include, but is not limited to: location, altitude, biometric information (presumably associated with the user), communications capability, functional capability, current communications speed, display capability, ability for remote management, recorded voice, and recorded locations. This step includes the obtaining of this information by database request, polling of the device or other methods.

In step 430, process 400 obtains user preferences. These preferences may be obtained from a user profile or user entry. Preferences may be used to modify a user specification, or as additional factors in a specification. For example, user preferences may specify which geographic areas will constitute an immediate notification zone (e.g., a set of locations in which images are immediately sent to police once they are received). User preferences may indicate that for the next ten minutes, all zones are immediate zones (e.g., as user walks to car from theater). User preferences may specify presentation of messages (e.g., large text) or input mode (e.g., voice navigation versus biometric).

In step 440, process 400 obtains user service specifications if they exist and other pertinent user data. While a provider of the security service may offer standard services, in a preferred embodiment, users may specify the service that they wish to obtain. For example, a service may provide base capability of receiving images, of time stamping them, holding images and forwarding to police if a countersignal is not received in five minutes. A user may specify a more elaborate service, for example, logging all images received, sending images immediately when location indicates an immediate zone, sending duplicate notifications to a relative, and upon determination of police notification, exercising control of the phone to capture ambient sound, voice, and to make an announcement that the police have been notified. In another example, if a user has a restraining order against a specific person, a user service specification may include face identification and immediate notification of police if the identified individual is legally precluded from close approach. In a preferred embodiment, such a user service specification may be used to determine when to use images, and further, what constitutes "use."

In step 450, process 400 associates the data with the appropriate image.

Figure 5:
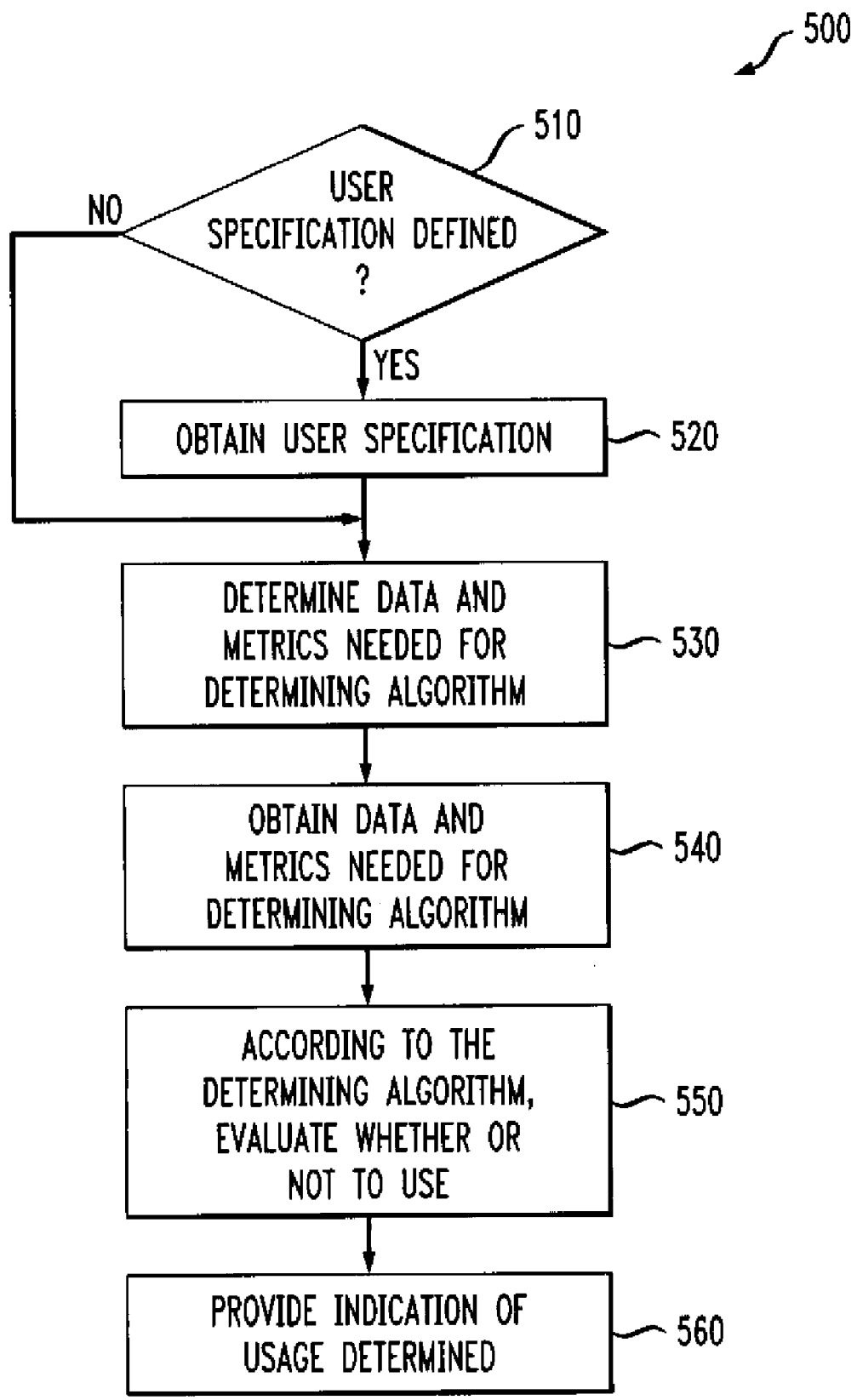
FIG. 5 is a flow diagram illustrating a process of determining whether to use an image, according to an embodiment of the present invention.

Referring now to FIG. 5, a flow diagram illustrates a process 500 of determining whether to use an image, according to an embodiment of the present invention. As mentioned above, FIG. 5 relates to details of step 330 of FIG. 3.

In step 510, process 500 determines whether a user specification, as described above, is available. If the answer is yes, then in step 520 the process obtains the specification, and continue to step 530. If the answer is no, then the process proceeds to step 530.

In step 530, process 500 determines what measurements and data will be required for determining whether to use an image. This is responsive to the user specification and the service specification and may include, but is not limited to, the user data collected in FIG. 4, as well as time of day, time since image collected, subsequent user messages, location, and terrorist threat level. In step 540, the process obtains the requisite data and metrics.

In step 550, process 500 determines whether or not to use the image, based on the data collected in step 540 and the specification of the service. This step may involve multiple steps including, for example, requests and reception of additional data such as biometrics or voice, processing including image processing such as object or face identification, image analysis such as determining distance of an object or person from the camera, trigger evaluation, and risk analysis.

In step 560, process 500 provides an indication of whether or not the image is to be used.

Figure 6:
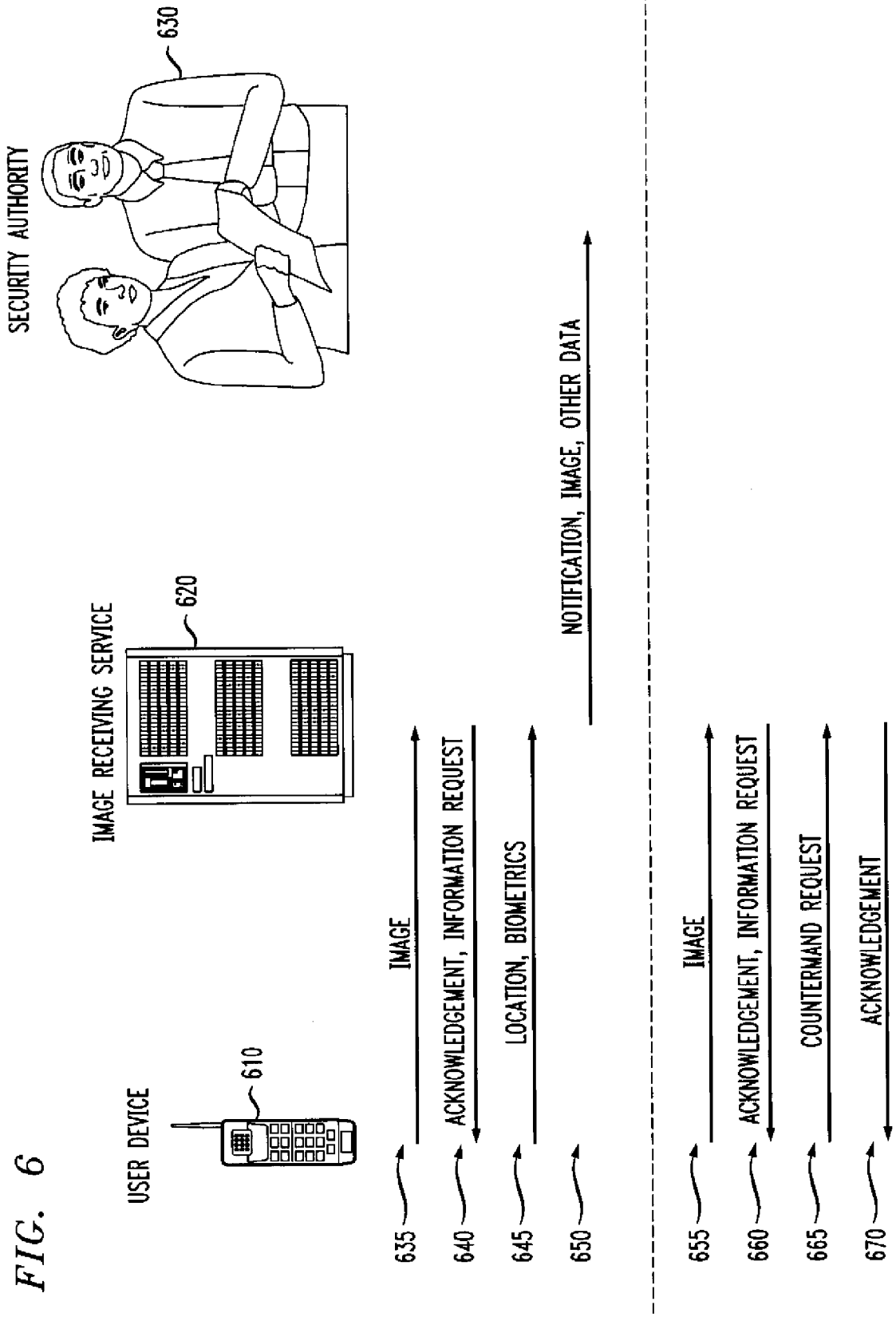
FIG. 6 is a diagram illustrating call flow examples, according to an embodiment of the present invention.

Referring now to FIG. 6, a diagram illustrates call flow examples, according to an embodiment of the present invention. The first column represents termination and initiation of messages from an end user device 610. The second column represents termination and initiation of messages from an image receiving server 620. The third column represents a receiving security authority 630 able to receive notification of security concern messages, and presumably to act on them.

Two call flows are described. The first, in a preferred embodiment, represented by messages 635 through 650, describes a series of communications resulting in a notification of the security authority. In message 635, the end user device transmits an image to the receiving server 620. The image presumably is of an individual or situation which warrants user concern. The receiving server 620 responds with an acknowledgment 640, which contains request for further information. Note that in some embodiments, the acknowledge message 640 is not required. The additional information optionally requested by 640 may include, but is not limited to: location, voice samples, biometric information, additional images, proximity data (e.g., Internet Protocol or IP addresses locally addressable through a Local Area Network). In this case, the additional data may be used to supplement image data in identifying the person in the image. For example, speaker identification may be possible from the voice sample. This in conjunction with face identification may allow higher levels of successful identification.

The user device responds with the requested information, noted as biometrics and location information. In message 650, the receiving server transmits a notification to a security authority containing the pertinent data. This notification may be transmitted on analysis of the user device information, may be transmitted after a period of time without further countermand, or by other algorithms as discussed above in the detailed description of FIG. 3.

A second scenario is described by means of messages 655 through 670. In message 655, the end user device 610 transmits an image to the receiving server 620. The image presumably is of an individual or situation which warrants user concern. The receiving server 620 responds with an acknowledgment 660, which contains a request for further information. Next, message 665 is transmitted from the user device 610 with a countermand, that is, a request that the receiving server 620 not use the image previously transmitted. The receiving server 620 responds with a message 670 acknowledging the request. Presumably, the image data previously received is handled by the receiving server 620 in accord with the request. In this scenario, no notification is made to the security authority 630.

While a simple service has been described, the invention clearly enables many services, some more complex. From a service provider perspective, for example, the invention may enable:

Image enhanced 911: Voice and image to 911 operators to request assistance, without voice component. This can be an extension of the E911 mandate covering wireless phones. In such a situation, it is sometimes impossible for a victim to dial the phone and talk to the operator, or even to talk to the operator once the connection is made.

Risk analysis: Image processing with face identification, voice identification, and/or analytics to evaluate likelihood of risk. This may include data mining of received information from multiple sources to assist in risk identification for this incident. This can also speed forensic analysis.

Personal black box: With a continuous imaging option, images are acquired and transmitted to a distant location. These can be still images or video. This safe store of images may be under control of the individual, and function in some measure as an image or video diary. Further, the image acquisition may continue once an emergency indication is received. This may thus allow acquisition of further information about the emergency or violent situation (e.g., if the unit is removed from the user this can provide information about location/taker/etc.). Privacy preferences may allow several services to be offered in this space, e.g., full diary, diary on demand, etc. Different levels of storage, in terms of time (e.g., 24 hour safestore) and quality (e.g., heavily compressed) may also pertain.

Bystander tip—Enables help because of information sent by someone nearby witnessing a dangerous situation.

Figure 7:
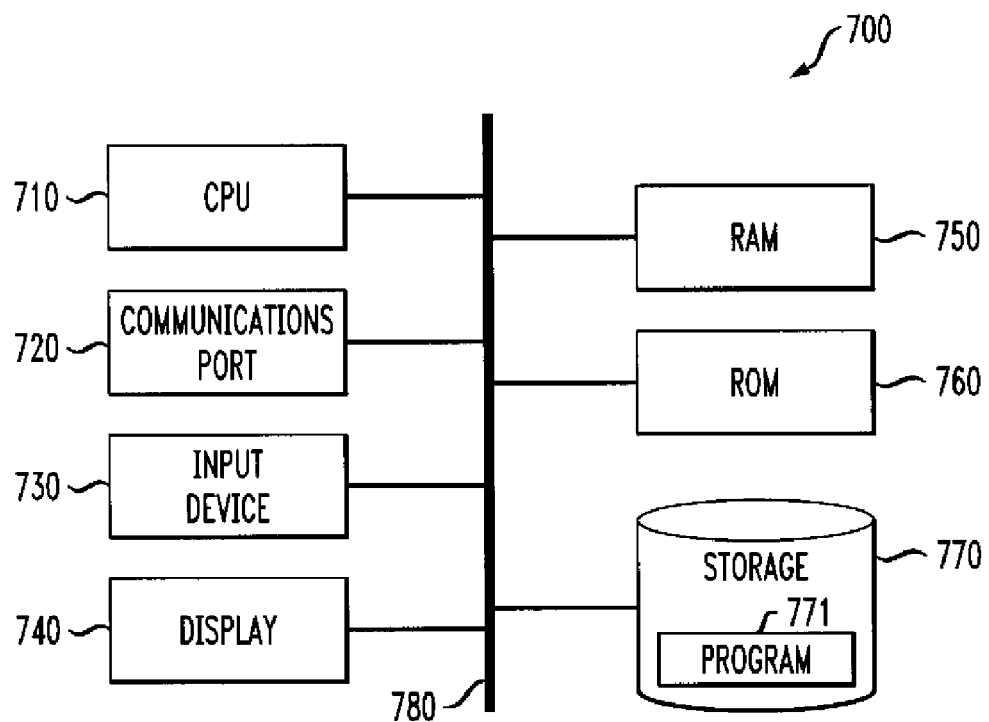
FIG. 7 is a block diagram illustrating a server for use in a security system, according to an embodiment of the present invention.

Referring now to FIG. 7, a block diagram illustrates a server for use in a security system, according to an embodiment of the present invention. For example, server 700 can correspond to either or both of servers 250 and 280 in FIG. 2. More specifically, FIG. 7 illustrates an internal architecture of server 700 according to one embodiment of the invention.

As illustrated) server 700 includes CPU (central processing unit) 710 in communication with communication bus 780. CPU 710 may be a Pentium, RISC (reduced instruction set computer), or other type of processor, and is used to execute processor executable process steps so as to control the components of server 700 to provide functionality according to embodiments of the present invention. Also in communication with communication bus 780 is communications port 720. Communication port 720 is used to transmit data to, and to receive data from, devices external to server 700. Communication port 720 is therefore preferably configured with hardware suitable to physically interface with desired external devices and/or network connections. In one embodiment, digital images and/or user data are received from user devices over communication port 720.

Input device 730 and display 740 are also in communication with communication bus 780. Any known input device may be used as input device 730 including, for example, a keyboard, mouse, touchpad, voice recognition system, or any combination of these devices. Input device 730 may be used by an entity to input user data, customer profiles, enrollment information, service specifications, or other data to server 700. Of course, such information may also be input to server 700 via communications port 720. Commands for controlling operation of server 700 may also be input using input device 730.

Server 700 may output to display 740 which may, for example, be an integral or separate CRT (cathode ray tube) display, flat panel display, or the like. Display 740 is generally used to output graphics, images and/or video, and text to an operator in response to commands issued by CPU 710.

RAM 750 is connected to communication bus 780 to provide CPU 710 with fast data storage and retrieval. In this regard, processor executable process steps being executed by CPU 710 are typically stored temporarily in RAM 750 and executed therefrom by CPU 710. ROM 760 in contrast provides storage from which data can be retrieved but to which data cannot be stored. Accordingly, ROM 760 is used to store invariant process steps and other data, such as basic input/output instructions and data used during system boot-up or to control communication port 720. It should be noted that one or both of RAM 750 and ROM 760 may communicate directly with CPU 710 instead of over communication bus 780.

Data storage device 770 stores, among other data, image receiving server programs of processor executable process steps for use by CPU 710. For example, CPU 710 executes process steps of program 711 in order to control server 700 in accordance with the present invention. More specifically, the process steps of program 771 may be read from a compute readable medium such as floppy disk, a CD ROM, a DVD ROM, a zip disk, a magnetic tape or a signal encoding the process steps and then stored in data storage device 770. It is to be understood that the present invention is not limited to any specific combination of hardware and software.

Figure 8:
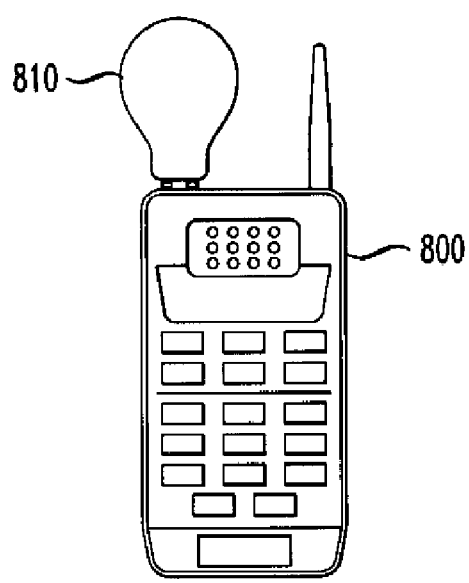
FIG. 8 is a block diagram illustrating a user device with public alert for use in a security system, according to an embodiment of the present invention.

Referring now to FIG. 8, a block diagram illustrates a user device with public alert for use in a security system, according to an embodiment of the present invention. That is, FIG. 8 represents a preferred embodiment of the user device. It is to be understood that the user device may have an internal architecture similar to that shown in FIG. 7. The device comprises component 800, similar in design to an integrated device such as those well known in the art today exemplified by the Nokia 3650 or Sanyo 5300. These devices contain cell phones for voice communication, and integrated image capture devices. Further, component 800 is augmented with component 810, a device used for visual public alert. Component 810 provides a visual indication to nearby people that an image has been captured and transmitted. For example, when the user of this device is in a threatening situation and has transmitted an image, component 810 may flash brightly five times making everyone in the vicinity aware that an image has been transmitted. This indicates to a potential attacker of the user of the device that he must now be concerned that were he to harm the user of the device, his picture is now stored safely in a location remote to the scene of the potential crime. One skilled in the art of current integrated devices will know how to augment such devices with a public alert component in the manner of the invention.

Referring lastly to FIG. 9, a diagram illustrates a call flow example with public alert, according to an embodiment of the present invention. More particularly, FIG. 9 shows a call flow using a public alert facility. The first column represents termination and initiation of messages from an end user device 910, equipped with a public alert facility (e.g., lamp or indicator 810 in FIG. 8). The second column represents termination and initiation of messages from an image receiving server 920. The third column represents a receiving security authority 930 able to receive notification of security concern messages, and presumably to act on them.

This flow shows a series of communications resulting in a notification of the security authority. In message 935, the end user device transmits an image to the receiving server 920. The image presumably is of an individual or situation which warrants user concern. The receiving server 920 responds with an acknowledgment 940, which contains request for further information. The message 940 also contains a public alert trigger. The user device 910, upon receiving the alert trigger, operates the public alert mechanism. Note that in a preferred embodiment, the public alert mechanism may not require receipt of a triggering message, but may be operated on completion of transmission. Note that in some embodiments, the acknowledge message 940 is not required. The additional information optionally requested by 940 may include, but is not limited to: location, voice samples, biometric information, additional images, proximity data (e.g., IP addresses locally addressable). In this case, the additional data may be used to supplement image data in identifying the person in the image. For example, speaker identification may be possible from the voice sample. This in conjunction with face identification may allow higher levels of successful identification.

The user device responds with the requested information, noted as biometrics and location information. In message 950, the receiving server transmits a notification to a security authority containing the pertinent data. This notification may be transmitted on analysis of the user device information, may be transmitted after a period of time without further countermand, or by other algorithms as discussed above in the detailed description of FIG. 3.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

We claim:

1. Apparatus for providing security in accordance with at least one user, comprising:
    means for receiving at least one image associated with a user device, the user device being associated with the at least one user;
    means for associating the at least one image with user data;
    means for determining whether to use the at least one image through the application of one or more rules of a user-specified service offering specification and one or more rules of a previously entered user specification having user preferences; and
    means for using the at least one image and at least a portion of the user data when indicated to do so in accordance with the determining operation.

2. Apparatus for operating a security service, comprising:
    a memory; and
    at least one processor operative to: (i) enroll at least one user in the security service; (ii) receive at least one image associated with a user device, the user device being associated with the at least one enrolled user; (iii) determine whether to use the at least one image through the application of one or more rules of a user-specified service offering specification and one or more rules of a previously entered user specification having user preferences; and (iv) charge the at least one enrolled user a fee for the security service.

3. The apparatus of claim 2, wherein the at least one processor is further operative to provide wireless communication for the user device.

4. The apparatus of claim 2, wherein the enrolling operation further comprises receiving user data.

5. An article of manufacture for operating a security service, comprising a non-transitory machine readable medium containing one or more programs which when executed implement the steps of:
    enrolling at least one user in the security service;
    receiving at least one image associated with a user device, the user device being associated with the at least one enrolled user;
    determining whether to use the at least one image through the application of one or more rules of a user-specified service offering specification and one or more rules of a previously entered user specification having user preferences; and
    charging the at least one enrolled user a fee for the security service.

6. Apparatus for providing security in accordance with at least one user, comprising:
    a memory; and
    at least one processor operative to: (i) capture one or more images in accordance with a user device, the user device being associated with the at least one user; (ii) transmit at least one of the one or more captured images from the user device to a security service in accordance with the application of one or more rules of a user-specified service offering specification and one or more rules of a previously entered user specification having user preferences; and (iii) alert the public, via the user device, in accordance with the capture of the one or more images.

7. The apparatus of claim 6, wherein the alerting operation further comprises use of at least one of a visual indicator, an audible indicator, an alarm, and a spoken phrase.

8. The apparatus of claim 6, wherein the at least one processor is further operative to receive voice data.

9. An article of manufacture for providing security in accordance with at least one user, comprising a non-transitory machine readable medium containing one or more programs which when executed implement the steps of:
    capturing one or more images in accordance with a user device, the user device being associated with the at least one user;
    transmitting at least one of the one or more captured images from the user device to a security service in accordance with the application of one or more rules of a user-specified service offering specification and one or more rules of a previously entered user specification having user preferences; and
    alerting the public, via the user device, in accordance with the capture of the one or more images.

10. Apparatus for processing at least one image in accordance with at least one user, comprising:
    a memory; and
    at least one processor operative to: (i) receive at least one image associated with a user device, the user device being associated with the at least one user; (ii) associate the at least one image with user data; (iii) determine whether to use the at least one image through the application of one or more rules of a user-specified service offering specification and one or more rules of a previously entered user specification having user preferences;

and (iv) using the at least one image and at least a portion of the user data when indicated to do so in accordance with the determining step.

11. An article of manufacture for processing at least one image in accordance with at least one user, comprising a non-transitory machine readable medium containing one or more programs which when executed implement the steps of:

receiving at least one image associated with a user device, the user device being associated with the at least one user;

associating the at least one image with user data;

determining whether to use the at least one image through the application of one or more rules of a user-specified service offering specification and one or more rules of a previously entered user specification having user preferences; and using the at least one image and at least a portion of the user data when indicated to do so in accordance with the determining step.

* * * * *